United States Patent
Hermann et al.

(10) Patent No.: US 8,932,739 B2
(45) Date of Patent: Jan. 13, 2015

(54) BATTERY PACK CONFIGURATION TO REDUCE HAZARDS ASSOCIATED WITH INTERNAL SHORT CIRCUITS

(75) Inventors: Weston Arthur Hermann, Palo Alto, CA (US); Scott Ira Kohn, Redwood City, CA (US); David G. Beck, Tiburon, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 634 days.

(21) Appl. No.: 13/088,444

(22) Filed: Apr. 18, 2011

(65) Prior Publication Data

US 2012/0034501 A1 Feb. 9, 2012

Related U.S. Application Data

(63) Continuation-in-part of application No. 12/850,282, filed on Aug. 4, 2010, now Pat. No. 8,133,608.

(51) Int. Cl.
*H01M 10/50* (2006.01)
*H01M 2/26* (2006.01)
*H02J 7/00* (2006.01)

(52) U.S. Cl.
USPC ............. 429/62; 429/120; 429/160; 429/161; 320/115; 320/133; 320/134

(58) Field of Classification Search
USPC ............. 429/62, 120, 160–161; 320/118, 134
See application file for complete search history.

(56) References Cited

U.S. PATENT DOCUMENTS

| | | | |
|---|---|---|---|
| 6,099,986 A | 8/2000 | Gauthier et al. | |
| 6,548,206 B1 * | 4/2003 | Gauthier et al. | 429/120 |
| 2002/0086578 A1 * | 7/2002 | Ikeda | 439/500 |
| 2005/0233210 A1 * | 10/2005 | Horie et al. | 429/161 |
| 2007/0188147 A1 * | 8/2007 | Straubel et al. | 320/134 |
| 2010/0136384 A1 * | 6/2010 | Kreiner et al. | 429/50 |

FOREIGN PATENT DOCUMENTS

| | | |
|---|---|---|
| JP | H02253652 | 10/1990 |
| JP | 06-223815 | 8/1994 |
| JP | H11297170 | 10/1999 |
| JP | H11329206 | 11/1999 |
| JP | 2008-053342 | 3/2008 |

OTHER PUBLICATIONS

European Patent Application No. 11006442.5, Extended European Search Report dated Nov. 14, 2011, 6 pages.

* cited by examiner

*Primary Examiner* — Muhammad Siddiquee
(74) *Attorney, Agent, or Firm* — J. Richard Soderberg (57) ABSTRACT

A battery pack, or battery pack module, is provided that is configured to respond to a short circuit of moderate current in a manner that minimizes the risk of an initial thermal runaway event propagating throughout the battery pack/battery pack module. In general, the battery pack/battery module allows pre-selection of which cell of the cells comprising the battery pack/battery pack module will be the last cell to respond to the short circuit. As a result, a thermal isolation barrier may be used to separate the preselected cell from the other cells of the battery pack/battery pack module, thereby minimizing the risk of excessive heating and extensive collateral damage.

21 Claims, 6 Drawing Sheets

BATTERY PACK CONFIGURATION TO REDUCE HAZARDS ASSOCIATED WITH INTERNAL SHORT CIRCUITS

CROSS-REFERENCES TO RELATED APPLICATIONS

This application is a continuation-in-part of U.S. patent application Ser. No. 12/850,282, filed Aug. 4, 2010, the disclosure of which is incorporated herein by reference for any and all purposes.

FIELD OF THE INVENTION

The present invention relates generally to battery packs and, more particularly, to a battery pack that is designed to mitigate the effects of arcing due to an internal short circuit.

BACKGROUND OF THE INVENTION

There is currently a trend in the automotive industry to replace combustion engines with electric motors or a combination of an electric motor and a combustion engine, thereby substantially reducing the environmental impact of automobiles by reducing (i.e., hybrids) or completely eliminating (i.e., electric vehicles) car emissions. This switch in drive train technology is not, however, without its technological hurdles as the use of an electric motor translates to the need for inexpensive batteries with high energy densities, long operating lifetimes, and operable in a wide range of conditions. Additionally, it is imperative that the battery pack of a vehicle pose no undue health threats, either during vehicle use or during periods of storage.

While current rechargeable battery technology is able to meet the demands of the automotive industry, the relatively unstable nature of the chemistries used in such batteries often leads to specialized handling and operating requirements. For example, rechargeable batteries such as lithium-ion cells tend to be more prone to thermal runaway than primary cells, thermal runaway occurring when the internal reaction rate increases to the point that more heat is being generated than can be withdrawn, leading to a further increase in both reaction rate and heat generation. Eventually the amount of generated heat is great enough to lead to the combustion of the battery as well as materials in proximity to the battery. Thermal runaway may be initiated by a short circuit within the cell, improper cell use, physical abuse, manufacturing defects, or exposure of the cell to extreme external temperatures. In the case of a battery pack used in an electric vehicle, a severe car crash may simultaneously send multiple cells within the battery pack into thermal runaway.

Figure 1:
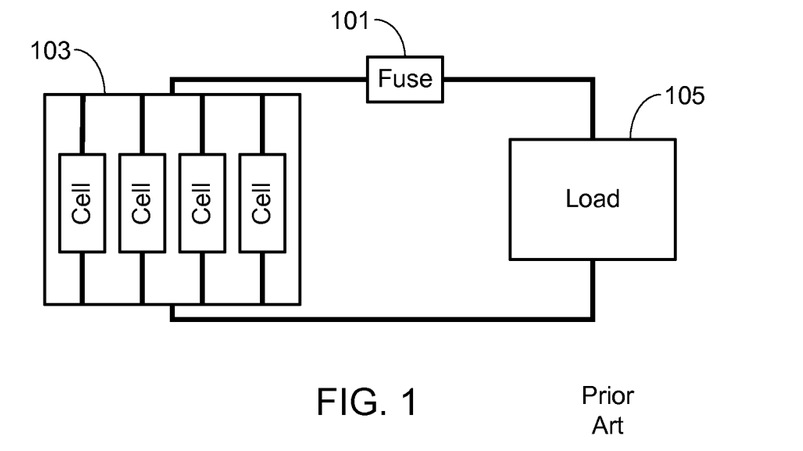
FIG. 1 illustrates a battery pack utilizing a fuse in the interconnect between the battery pack and the load in accordance with the prior art.

In order to prevent overheating due to an inadvertent short, thereby hopefully preventing the occurrence of a thermal runaway event, conventional battery packs typically position a fuse 101 in series with one, or both, interconnects that couple the battery pack 103 to the load 105 as shown in FIG. 1. Unfortunately, as fuse 101 is designed to prevent low resistance, high current shorts, it may not open and interrupt a sustained current of moderate magnitude such as that which may occur during an internal battery short. In these situations, the affected battery will continue to heat until a cell-level safety mechanism is activated.

Figure 2:
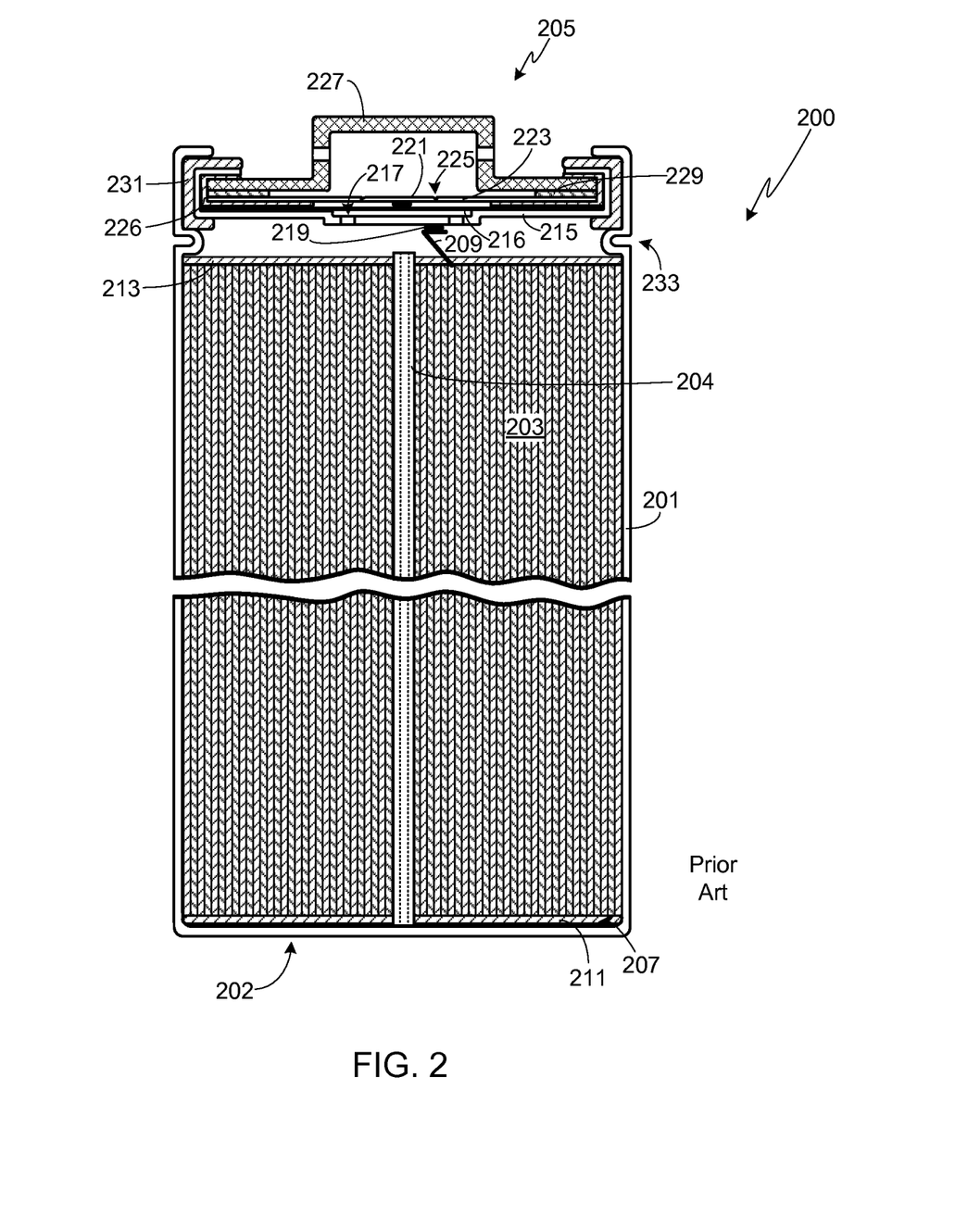
FIG. 2 is a simplified cross-sectional view of a conventional battery, for example a lithium ion battery utilizing the 18650 form-factor.

Conventional cells, especially those prone to thermal runaway, typically incorporate a variety of different safety mechanisms into the cell itself as illustrated in the simplified cross-sectional view provided in FIG. 2. Battery 200 includes a cylindrical case 201, an electrode assembly 203, and a cap assembly 205. Case 201 is typically made of a metal, such as nickel-plated steel, that has been selected such that it will not react with the battery materials, e.g., the electrolyte, electrode assembly, etc. Typically cell casing 201 is fabricated in such a way that the bottom surface 202 is integrated into the case, resulting in a seamless lower cell casing. Electrode assembly 203 is comprised of an anode sheet, a cathode sheet and an interposed separator, wound around a center pin 204 to form a 'jellyroll'. Typically center pin 204 is hollow, i.e., it includes a void running its entire length, thus providing a path for gases formed during an over-pressure event to escape the cell via the vent contained within electrode cap assembly 205. An anode electrode tab 207 connects the anode electrode of the wound electrode assembly to the negative terminal which, for an 18650 cell, is case 201. A cathode tab 209 connects the cathode electrode of the wound electrode assembly to the positive terminal via cap assembly 205. Typically battery 200 also includes a pair of insulators 211/213 located on either end of electrode assembly 203 to avoid short circuits between assembly 203 and case 201.

In cell 200, tab 209 is connected to cap assembly 205, which contains a current interrupt device (CID). The purpose of the CID is to break the electrical connection between the electrode assembly and the positive terminal 227 if the pressure within the cell exceeds a predetermined level. Typically such a state of over pressure is indicative of cell overcharging and/or of the cell temperature increasing beyond the intended operating range of the cell, for example due to an extremely high external temperature or due to a failure within the battery or charging system. Although other CID configurations are known, in the illustrated cell the CID is comprised of a lower member 215 and an upper member 216. Members 215 and 216 are electrically connected, for example via crimping along their periphery with a spot weld. Lower member 215 includes multiple openings 217, thus insuring that any pressure changes within case 201 are immediately transmitted to upper CID member 216. The central region of upper CID member 216 is scored (not visible in FIG. 2) so that when the pressure within the cell exceeds the predetermined level, the scored portion of member 216 breaks free, thereby disrupting the continuity between the electrode assembly 203 and the battery terminal.

Under normal pressure conditions, lower CID member 215 is coupled by a weld 219 to electrode tab 209 and upper CID member 216 is coupled by a weld 221 to safety vent 223. In addition to disrupting the electrical connection to the electrode assembly during an over pressure event, the CID in conjunction with safety vent 223 is designed to allow the gas to escape the cell in a somewhat controlled manner. Safety vent 223 may include scoring 225 to promote the vent rupturing in the event of over pressure.

The periphery of CID members 215/216 is electrically isolated from the periphery of safety vent 223 by an insulating gasket 226. As a consequence, the only electrical connection between CID members 215/216 and safety vent 223 is through weld 221.

Safety vent 223 is coupled to battery terminal 227 via a positive temperature coefficient (PTC) current limiting element 229. PTC 229 is designed such that its resistance becomes very high when the temperature exceeds a predetermined level, thereby limiting short circuit current flow. Cap assembly 205 further includes a second insulating gasket 231 that insulates the electrically conductive elements of the cap assembly from case 201. Cap assembly 205 is held in place within case 201 using crimped region 233.

In addition to the inclusion of a CID, a PTC and a safety pressure vent, many cells also utilize a separator within the electrode assembly 203 that is capable of impeding current flow once a predetermined temperature is reached. In such a separator, the material comprising the separator is designed to soften upon reaching the preset temperature (e.g., 130° C.), at which point the pores close and impede ion and current flow. Unfortunately if the temperature of the cell continues to increase, the material comprising the separator will completely melt and break-down, resulting in a massive internal short that can accelerate heating.

While individual cells may include one or more built-in safety mechanisms, as noted above, these safety mechanisms are not always effective when the cell is one of a large group of cells, i.e., the battery pack of FIG. 1. For example, the CID within a cell typically has a relatively low voltage rating and therefore may be subject to arcing and fire when it attempts to open in a high voltage battery pack. As a result, the cell may enter into a state of thermal runaway. Additionally, due to the excessive heat generated by such an event, the temperature of adjacent cells within the battery pack will also increase, potentially leading to a cascading effect where the initiation of thermal runaway within a single cell propagates throughout the entire battery pack. In such a situation, not only is power from the battery pack interrupted, but the system employing the battery pack is more likely to incur extensive collateral damage due to the scale of thermal runaway and the associated release of thermal energy. While it is possible to design a battery pack that minimizes the risks of arcing or excessive heating, such an approach leads to increased cost, complexity and weight, all of which may be quite significant in a large battery pack such as that employed in a hybrid or an all-electric vehicle. Accordingly, what is needed is a means of minimizing the risks associated with an internal short circuit within a battery pack, while not significantly impacting battery pack manufacturing cost, complexity and weight. The present system provides such a means.

SUMMARY OF THE INVENTION

The present invention provides a battery pack, or a battery pack module, that is configured to respond to a short circuit of moderate current in a manner that minimizes the risk of an initial thermal runaway event propagating throughout the battery pack/battery pack module. In general, the disclosed system allows pre-selection of which cell (or cells) of the cells comprising the battery pack/battery pack module will be the last cell(s) to respond to the short circuit. As a result, a thermal isolation barrier may be used to separate the preselected cell (s) from the other cells of the battery pack/battery pack module, thereby minimizing the risk of excessive heating and extensive collateral damage.

In one aspect of the invention, a battery pack short circuit management system is provided that includes a battery pack comprised of (i) a plurality of cells characterized by a set of operating characteristics, wherein each cell is electrically connected to a first collector plate and a second collector plate, and wherein each cell includes a first internal short circuit safety mechanism configured to activate at a first temperature; and (ii) a preselected cell distinguishable from the plurality of cells, wherein the preselected cell is electrically connected to the first and second collectors plates, and wherein the preselected cell includes a second internal short circuit safety mechanism configured to activate at a second temperature, the second temperature being greater than the first temperature (for example, by at least 10° C.). The battery pack short circuit management system also includes a thermal isolation system that thermally separates the preselected cell from the plurality of cells. When activated, the first internal short circuit safety mechanism may decouple the cell with the activated safety mechanism from at least one of the first and second collector plates. When activated, the second internal short circuit safety mechanism may prevent current flow between the anode electrode and the cathode electrode of the electrode assembly of the preselected cell. In at least one embodiment, the first internal short circuit safety mechanism associated with each of the plurality of cells is comprised of a current interrupt device (CID) while the second internal short circuit safety mechanism associated with the preselected cell is comprised of a separator shutdown mechanism. In this embodiment, the preselected cell does not include a CID. In at least one other embodiment, a CID of a first configuration is integrated within each of the plurality of cells and a CID of a second configuration is integrated within the preselected cell, where the CID of the first configuration opens at the first temperature and the CID of the second configuration opens at the second, higher temperature. The plurality of cells may be electrically connected in parallel with the preselected cell electrically connected in parallel with the plurality of cells. The thermal isolation system may utilize an enclosure, for example an enclosure that is (i) fabricated from a ceramic material; (ii) fabricated in the form of a double-walled structure, for example where the outer wall is fabricated from a metal and the inner wall is fabricated from a non-metal such as a ceramic; (iii) fabricated to include an inner surface coated with an intumescent material; (iv) fabricated to include an interior volume at least partially filled with a thermally non-conductive material such as loose ceramic fibers, woven ceramic fibers, loose fiberglass fibers or woven fiberglass fibers; or (v) fabricated to include a phase change material. The battery pack short circuit management system may further include (i) a first battery cooling system comprised of a first liquid coolant contained within a first coolant line in thermal communication with the plurality of cells and (ii) a second battery cooling system comprised of a second liquid coolant contained within a second coolant line in thermal communication with the preselected cell, where the first and second battery cooling systems are independent of one another. The second coolant line may be integrated within at least one wall of the thermal isolation enclosure. The battery pack short circuit management system may further include a thermal runaway quenching system coupled to the preselected cell, for example via the thermal isolation system, and preferably not coupled to the plurality of cells.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries electrically interconnected to achieve the desired voltage and capacity for a particular application, where the multiple batteries may be contained within a single piece or multi-piece housing. It should be understood that identical element symbols used on multiple figures refer to the same component, or components of equal functionality. Additionally, the accompanying figures are only meant to illustrate, not limit, the scope of the invention and should not be considered to be to scale.

As previously described, when a short circuit event does not cause a system or battery pack level fuse to blow and interrupt the flow of current, for example because the short is of a moderate current level, then the system must rely on the safety mechanisms integrated within the individual cells to decouple the cells from the circuit. Unfortunately, as these safety mechanisms typically have a relatively low voltage rating, in a high voltage battery pack the last safety mechanism to trigger is likely to subject the corresponding cell to arcing and fire. This, in turn, is likely to cause the cell to enter into a state of thermal runaway, an event which may propagate throughout a conventional battery pack. Accordingly, the present invention allows a battery pack, or battery pack module, to be designed so that a particular, predetermined cell of the plurality of cells comprising the pack/module will be the last cell to respond to the short circuit event. By predetermining which of the battery pack's cells will be the last cell to respond to the short circuit, special precautions may be taken to insure that even if this cell enters into thermal runaway, that thermal runaway event will not propagate throughout the battery pack. Additionally, this approach allows the system to be designed with minimal precautions taken for the remaining cells within the battery pack, thereby potentially offering weight and cost savings.

Figure 3:
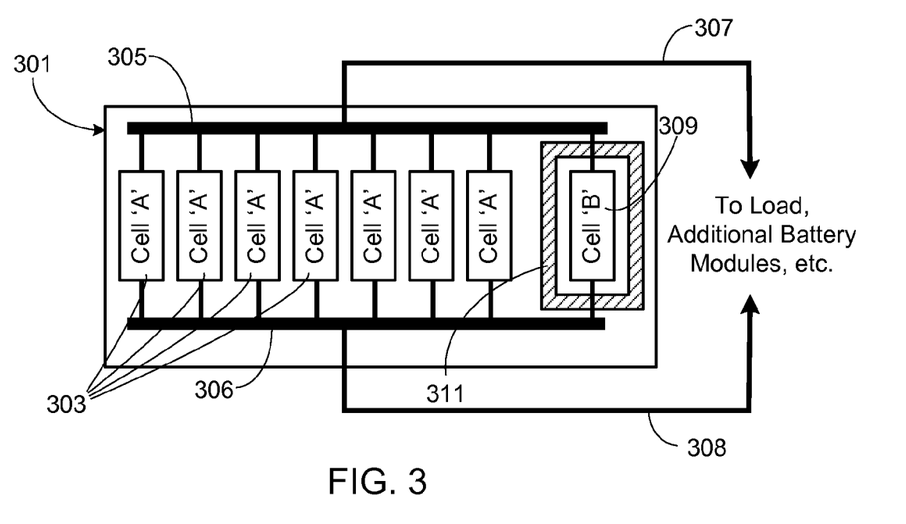
FIG. 3 provides a high-level view of a battery pack utilizing a thermal isolation enclosure surrounding the cell that has been preselected to be the last cell to respond to a short circuit event.

FIG. 3 provides a high-level view of a battery pack 301 utilizing the invention. As described in further detail below, the present invention may be utilized in any group of cells that are arranged in a parallel configuration, regardless of the number of cells or whether the group of cells forms the entire battery pack or only one module of a plurality of serially interconnected battery modules. Within battery pack 301 are a plurality of cells 303, labeled Cell 'A', that are of substantially the same design and characterized by the same set of operating characteristics, i.e., same battery chemistry, same energy density, same configuration, same voltage/current characteristics, etc. Additionally, these cells utilize the same internal safety mechanisms, including a CID. Each cell 303 is electrically connected to a pair of collector plates 305/306. The collector plates are electrically connected to the intended load or to another battery pack module via lines 307/308. Although not shown, a fuse may be connected to one or both lines 307 and 308, for example prior to connection with another battery pack module.

In addition to cells 303, battery pack 301 includes a cell 309, labeled Cell 'B'. Cell 309 is also connected, in parallel, to the load via collector plates 305/306. In general, cell 309 utilizes the same design and is characterized by the same set of operating characteristics (i.e., chemistry, energy density, configuration and voltage/current characteristics) as cells 303. Cell 309 is distinguishable from cells 303, however, in the design and configuration of its internal safety mechanisms. For example, in a preferred embodiment, cell 309 does not include a CID. As a result, while all of the cells within pack 301 will function similarly under normal operating conditions, cell 309 will not respond in the same way as cells 303 during an internal short circuit situation that is of insufficient current to trigger a system or battery pack level fuse.

During a short circuit of moderate current, insufficient to trigger system or battery pack fuses, cells 303 and cell 309 will begin to heat-up. As the temperature of the cells within the battery pack becomes high enough, the CIDs within cells 303 will begin to open, thereby decoupling the affected cells from the collector plates and thus the load at no significant voltage potential since the last cell is still in circuit. The order that the CIDs within cells 303 will trigger depend upon a variety of factors, including minor cell to cell variations that arise during manufacturing as well as starting temperature, location within the battery pack, etc. However, as cell 309 does not include a CID, it will continue to heat-up after all of the other cells within the pack, i.e., cells 303, have been decoupled from the current via operation of their respective CIDs. As a result, the risk of sustained arcing within cells 303 is substantially reduced.

As cell 309 does not include a CID, it will continue to heat-up after the CIDs corresponding to cells 303 have opened, decoupling these cells from the collector plates 305/306. Assuming that cell 309 includes a separator that shuts off current flow at a predefined temperature (e.g., 130° C.), once this temperature is reached and the pores within the separator close, ion and current flow between the anode and cathode of the electrode assembly is terminated. Of course if the temperature continues to rise after separator shut-down, or if the separator shut-down is ineffective in stopping the heating, the temperature will eventually be high enough to cause a complete break-down of the separator material leading to a massive electrical short and typically thermal runaway. The temperature at which the separator experiences complete break-down depends upon the material comprising the separator, although typically it will be set within the range of 130° C. to 190° C. Additionally, as the separator is typically only rated to a voltage in the range of 10 to 30 volts, and given that this voltage may be only a small fraction of the voltage that cell 309 is subjected to once cells 303 open, even after the separator shuts-down arcing is likely to occur, causing the temperature of cell 309 to continue to increase, thereby resulting in cell 309 entering into thermal runaway. Note that if the separator within cell 309 is not designed to break-down at a predetermined temperature, as preferred, the cell temperature will continue to increase until a different safety mechanism (e.g., fuse) is activated or until cell 309 enters into a state of thermal runaway.

Figure 4:
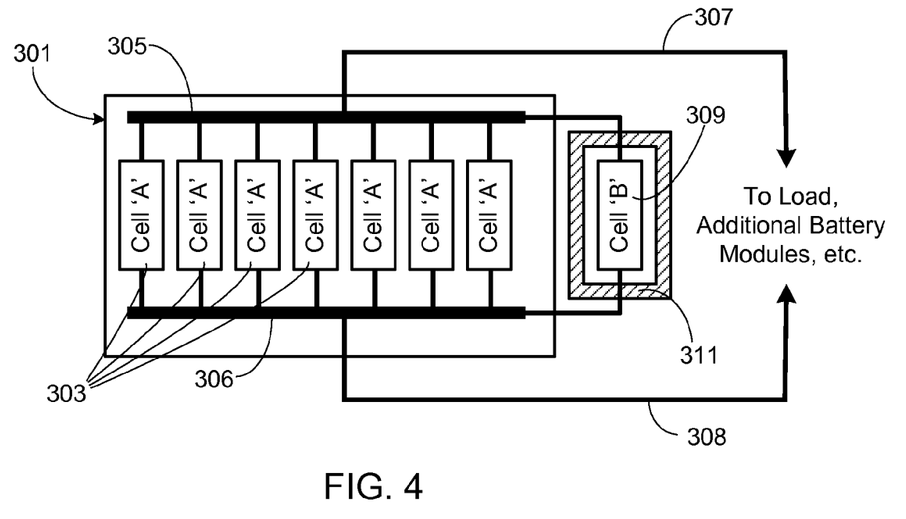
FIG. 4 provides a high-level view of a battery pack similar to that shown in FIG. 3 except that the thermal isolation enclosure is mounted outside of the battery pack.

By preselecting and identifying the cell within the battery pack that will respond last to a short circuit, special precautions may be taken to thermally isolate this cell. Thermally isolating the cell, i.e., cell 309, substantially minimizes, if not altogether eliminates, the risk that the increased temperature of the cell during a short circuit may adversely affect neighboring cells. Thermal isolation of cell 309 also helps to limit the type of collateral damage that often occurs to adjacent materials and components when a cell or cells undergo thermal runaway. This aspect of the invention is illustrated in FIG. 3 in which cell 309 is shown housed within a thermal isolation enclosure 311. It will be appreciated that thermal isolation enclosure 311 may be contained within battery pack enclosure 301, or mounted outside of battery pack enclosure 301 as shown in FIG. 4. Additionally, it should be understood that while a thermal isolation enclosure 311 is preferred, other means of thermally isolating the cell are equally applicable to the invention. For example, the preselected cell may be thermally isolating using a combination of distance and thermal barriers.

Thermal isolation enclosure 311 may be made of any of a variety of materials utilizing a variety of enclosure designs, the primary consideration being the design and material's ability to thermally isolate cell 309 from its surroundings. Secondary considerations applied to the enclosure design and material selection for enclosure 311 are weight, manufacturing complexity, fabrication cost and material cost. Exemplary enclosure designs are provided below in FIGS. 5-7. It should be understood that while these exemplary enclosures are demonstrated on the system configuration shown in FIG. 3, they are equally applicable to the system configuration shown in FIG. 4 in which thermal isolation enclosure 311 is mounted outside of battery pack enclosure 301.

In the enclosure embodiment illustrated in FIGS. 3 and 4, the walls of the enclosure are fabricated from a thermally non-conductive material with a high melting point. Preferably the material is also electrically non-conductive. In one configuration, the selected material is a ceramic.

Figure 5:
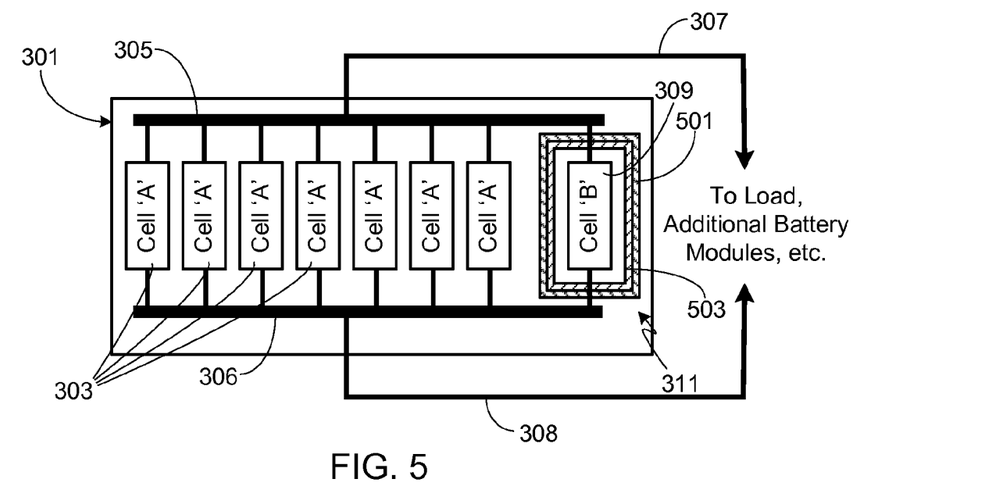
FIG. 5 provides a high-level view of a battery pack similar to that shown in FIG. 3 except that the thermal isolation enclosure utilizes a double-walled structure.

In the embodiment of the thermal isolation enclosure illustrated in FIG. 5, enclosure 311 utilizes a double-walled enclosure. Preferably outer wall 501 provides a rigid, strong enclosure that is relatively easy to incorporate into a vehicle or other battery pack application while inner wall 503 provides superior thermal isolation. In one exemplary design, outer wall 501 is fabricated from a metal, e.g., aluminum or an aluminum alloy, while inner wall 503 is fabricated from a material with the desired thermal properties such as a ceramic. Note that walls 501 and 503 may be separate, for example comprising inner and outer enclosures. Alternately, walls 501 and 503 may be fully integrated, for example by applying a coating of a ceramic or other thermally non-conductive material 503 to the inner surfaces of the outer enclosure walls 501. It will be appreciated that while FIG. 5 illustrates a dual wall structure, enclosure 311 may be comprised of more than two walls.

Figure 6:
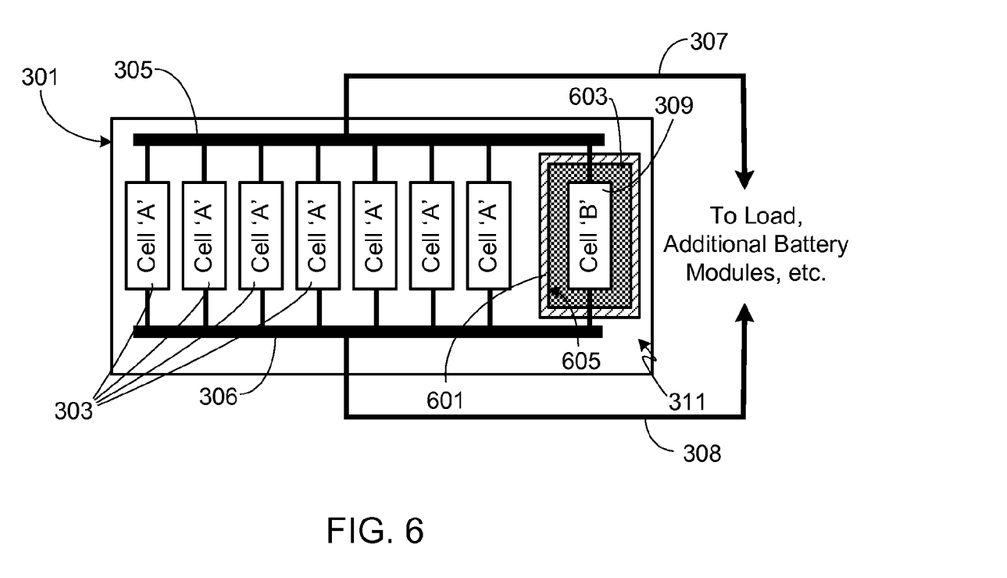
FIG. 6 provides a high-level view of a battery pack similar to that shown in FIG. 3 except that the interior volume of the thermal isolation enclosure is filled with a thermally non-conductive material.

The embodiment of the thermal isolation enclosure illustrated in FIG. 6 is similar to that shown in FIGS. 3 and 4, except that the interior volume of housing 601 is at least partially filled with a thermally non-conductive material 603 that surrounds cell 309 and at least partially fills the void between cell 309 and the interior walls 605 of vessel 601. Material 603 may be comprised of loose ceramic fibers, woven ceramic fibers, loose fiberglass fibers, woven fiberglass fibers, etc. Material 603 may be comprised of a phase change material. If a woven material is used, preferably it is wrapped around cell 309. If a loose material is used, preferably it is blown or injected into vessel 601 after cell 309 and it's interconnects are in place within housing 601.

Figure 7:
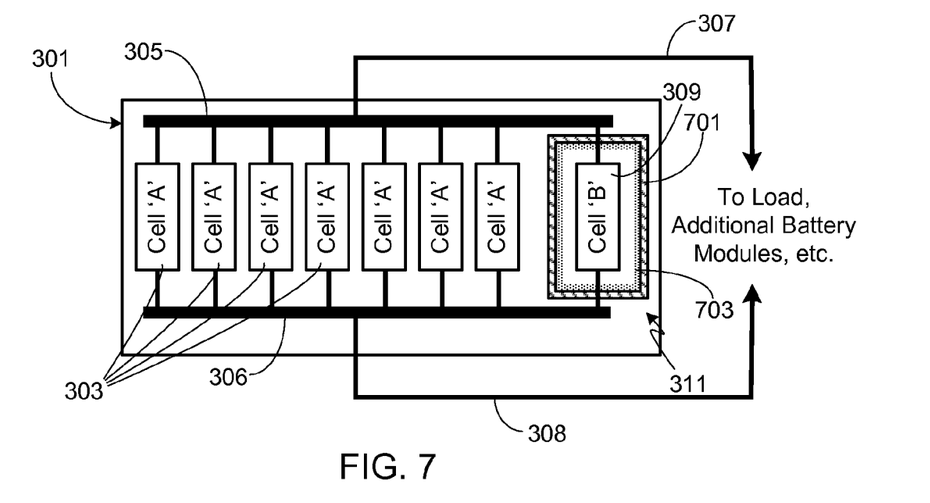
FIG. 7 provides a high-level view of a battery pack similar to that shown in FIG. 3 except that the interior surfaces of the thermal isolation enclosure are coated with an intumescent material.

In the embodiment of the thermal isolation enclosure illustrated in FIG. 7, the interior surfaces of housing 701 are coated with an intumescent material 703. Intumescent material 703 absorbs the thermal energy generated by cell 309 as it overheats. Once the intumescent material's activation temperature is reached, also referred to as the material's start expansion temperature or "SET", layer 703 will expand and provide a thermal barrier between cell 309 and housing 701. Preferably the material selected for layer 703 has a SET temperature greater than 150° C., for example in the range of 200° C. to 300° C. It will be appreciated that there are a variety of suitable intumescent materials, for example graphite-based intumescent material (e.g., expandable graphite in a polymeric binder), thermoplastic elastomers, ceramic-based intumescent material, vermiculite/mineral fiber based intumescent material, and ammonium polyphosphate based intumescent material.

Figure 8:
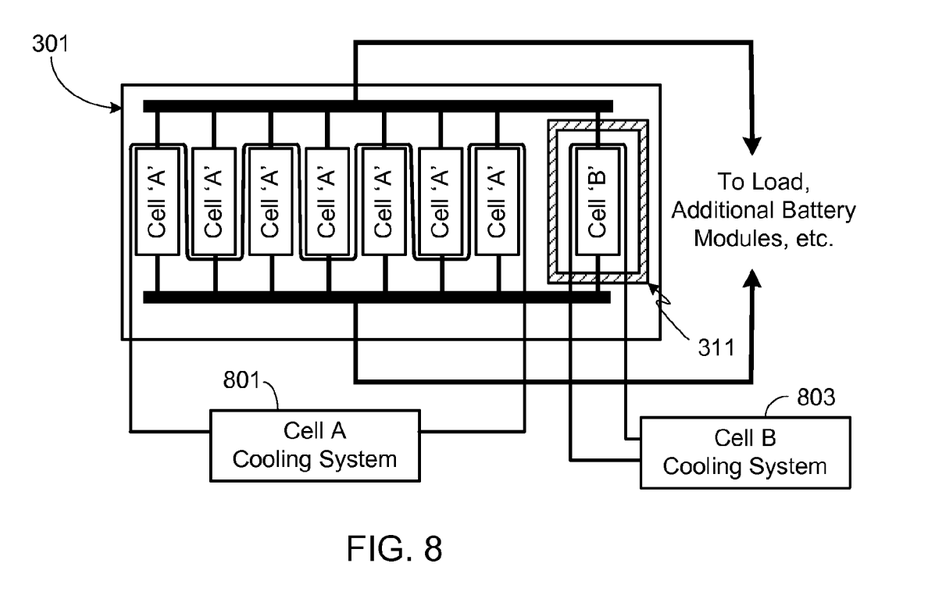
FIG. 8 provides a high-level view of a battery pack similar to that shown in FIG. 3 that includes an exemplary cooling system.
Figure 9:
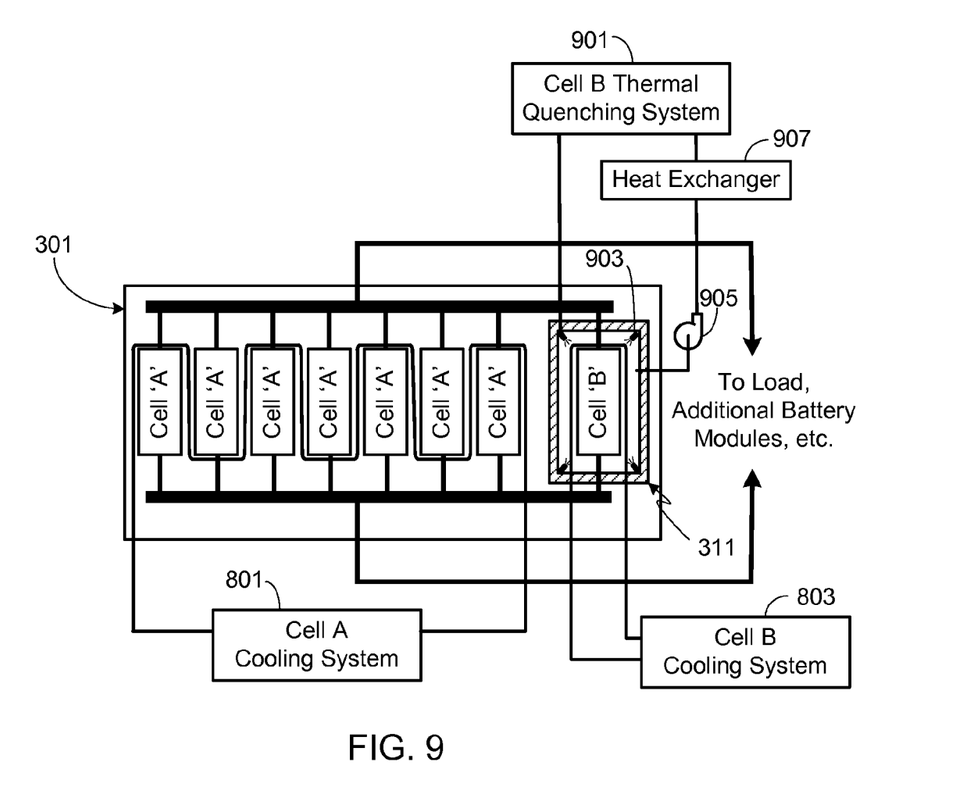
FIG. 9 provides a high-level view of a battery pack similar to that shown in FIG. 3 that includes an exemplary thermal runaway quenching system.

By preselecting the cell within a battery pack that will be the last cell of the pack to be affected by a short circuit event, not only can the preselected cell be located within a thermal isolation enclosure as described above, but the affected cell can also be linked to a separate cooling system or thermal event quenching system. An exemplary cooling system configuration is shown in FIG. 8 and an exemplary quenching system is shown in FIG. 9. While the embodiments illustrated in FIGS. 8 and 9 are based on the thermal isolation enclosure of FIG. 3, it should be understood that they are equally applicable to other enclosure designs (e.g., those shown in FIGS. 5-7) as well as other battery pack configurations such as that shown in FIG. 4.

As shown in FIG. 8, while not required, the present invention allows two different cell cooling systems to be employed, one used with the majority of cells within battery pack 301, i.e., cells 303, and a different cooling system with the preselected cell of pack 301, i.e., cell 309. Alternately, one cooling system may be used with all of the cells of the battery pack, and a second, additional cooling system may be used only with the preselected cell. Utilizing separate cooling systems offers several advantages. First, it allows the two cooling systems to employ different cooling rates and, if desired, different cooling methodologies (e.g., air cooling versus liquid cooling). For example, since cooling system 801 is only needed to cool the cells within a normal operational temperature range, it may be configured to have less cooling capacity, on a per cell basis, than cooling system 803 which is intended to cool a cell, i.e., cell 309, experiencing thermal runaway. Second, even if cooling system 803 is damaged when cell 309 enters into thermal runaway, cooling system 801 may be configured to continue operation, thus helping to maintain cells 303 within a reasonable range of temperatures. Third, since the system of the invention is designed to maintain cells 303 at a lower temperature than cell 309 during a short circuit, the coolant conduits associated with cooling system 801 do not have to be designed to withstand the same temperatures as the coolant conduits associated with cooling system 803. As a result of this design flexibility, it is possible to use lighter weight materials (e.g., plastic) for cooling system 801 conduits than for cooling system 803 (e.g., metal). Similarly, the conduits associated with cooling system 803 may be provided with additional protection, for example by being integrated within the walls of enclosure 311, thereby enabling cooling system 803 to continue to operate even after the temperature of cell 309 increases well beyond the normal cell operational range.

Regardless of whether a single cooling system is used to cool all of the cells within battery pack 301, or one cooling system is used to cool cells 303 and another cooling system used to cool cell 309 as illustrated in FIG. 8, the present invention also simplifies the use of a thermal runaway quenching system since such a system would only be necessary for the preselected cell or cells. For example, in the present exemplary system, only cell 309 would have to be coupled to the quenching system, thus minimizing cost, weight and system complexity.

FIG. 9 shows the configuration illustrated in FIG. 8 with the addition of a thermal runaway quenching system 901. It will be appreciated that the invention is not limited to a specific type of quenching system and that the present embodiment is merely intended to illustrate, not limit, the use of such a system with the present invention. As shown, the quenching system 901 includes a plurality of nozzles 903 mounted in proximity to the preselected cell. In this embodiment, nozzles 903 are mounted within enclosure 311. Once the temperature of the preselected cell, or the temperature within enclosure 311, indicates either the onset of a thermal runaway event or a thermal runaway event in progress, system 901 pumps a quenching fluid through nozzles 903 onto cell 309. Alternately, system 901 may be triggered based on voltage and current measurements that indicate that the CIDs of the other cells have opened. Preferably system 901 recirculates the quenching fluid, for example using pump 905. Typically the quenching fluid passes through a heat exchanger 907, for example a radiator or a heat exchanger coupled to another vehicle cooling system. In at least one preferred configuration, cooling system 803 and quenching system 901 are combined into a single temperature control system corresponding to cell 309.

In the preferred embodiment, and as described in detail above, all of the cells comprising battery pack 301, except cell 309, include a CID. As a result, cell 309 is preselected to be the last cell of battery pack 301 to succumb to a moderate current level short. By preselecting cell 309, special precautions may be taken to insure that if it does enter into thermal runaway, that thermal event will not propagate throughout the remaining cells of pack 301 or cause undue collateral damage. While this approach of preselecting one cell to be the last cell to respond to a short is preferred, the inventors envision that other techniques may be employed to achieve the same goal. For example, in an alternate embodiment, all of the cells within battery pack 301 include a CID. However, the CIDs in cells 303 are configured to open at a lower temperature and pressure than the CID that corresponds to cell 309. For example, in one embodiment the CIDs of cells 303 open at a pressure that corresponds to a cell temperature of approximately 120° C. while the CID of cell 309 opens at a pressure that corresponds to a cell temperature of approximately 140° C. As a result, and as previously described, all of the non-isolated cells, i.e., cells 303, will open prior to cell 309, thereby allowing special precautions to be taken to thermally isolate cell 309.

As will be understood by those familiar with the art, the present invention may be embodied in other specific forms without departing from the spirit or essential characteristics thereof. For example, while the invention has been described in terms of lithium ion cells, the invention is not so limited. Accordingly, the disclosures and descriptions herein are intended to be illustrative, but not limiting, of the scope of the invention which is set forth in the following claims.

What is claimed is:

1. A battery pack short circuit management system, comprising:
  a battery pack, comprising:
    a plurality of cells each of which is characterized by a set of operating characteristics, wherein each of said cells is electrically connected to a first collector plate and a second collector plate, and wherein each of said plurality of cells further comprises a first internal short circuit safety mechanism configured to activate at a first temperature; and
    a preselected cell distinguishable from said plurality of cells, wherein said preselected cell is electrically connected to said first collector plate and said second collector plate, wherein said preselected cell has a second internal short circuit safety mechanism configured to activate at a second temperature, wherein said second temperature is greater than said first temperature, and wherein said preselected cell is characterized by said set of operating characteristics; and
  a thermal isolation system thermally separating said preselected cell from said plurality of cells.

2. The battery pack short circuit management system of claim 1, wherein said first internal short circuit safety mechanism decouples a corresponding cell of said plurality of cells from at least one of said first and second collector plates when activated.

3. The battery pack short circuit management system of claim 1, wherein when said second internal short circuit safety mechanism is activated said second internal short circuit safety mechanism prevents current flow between an anode electrode and a cathode electrode of an electrode assembly of said preselected cell.

4. The battery pack short circuit management system of claim 1, wherein said first internal short circuit safety mechanism of each of said plurality of cells corresponds to a current interrupt device (CID) integrated within each of said plurality of cells, wherein said preselected cell does not include a CID, and wherein said second internal short circuit safety mechanism of said preselected cell corresponds to a separator shutdown mechanism.

5. The battery pack short circuit management system of claim 1, wherein said first internal short circuit safety mechanism of each of said plurality of cells corresponds to a first configuration of a current interrupt device (CID) integrated within each of said plurality of cells, wherein said second internal short circuit safety mechanism of said preselected cell corresponds to a second configuration of said CID integrated within said preselected cell, wherein said first configuration of said CID is configured to open at said first temperature, and wherein said second configuration of said CID is configured to open at said second temperature.

6. The battery pack short circuit management system of claim 1, wherein said second temperature is at least 10° C. greater than said first temperature.

7. The battery pack short circuit management system of claim 1, wherein said plurality of cells are electrically connected in parallel and said preselected cell is electrically connected in parallel with said plurality of cells.

8. The battery pack short circuit management system of claim 1, wherein said thermal isolation system is comprised of a thermal isolation enclosure.

9. The battery pack short circuit management system of claim 8, wherein said thermal isolation enclosure is fabricated from a ceramic material.

10. The battery pack short circuit management system of claim 8, wherein said thermal isolation enclosure is a double-walled structure.

11. The battery pack short circuit management system of claim 10, wherein an outer wall of said double-walled structure is fabricated from a metal, and wherein an inner wall of said double-walled structure is fabricated from a non-metal.

12. The battery pack short circuit management system of claim 11, wherein said non-metal is a ceramic material.

13. The battery pack short circuit management system of claim 8, wherein an interior surface of said thermal isolation enclosure is coated with a non-metal material.

14. The battery pack short circuit management system of claim 13, wherein said non-metal material is comprised of an intumescent material.

15. The battery pack short circuit management system of claim 8, wherein an interior volume of said thermal isolation enclosure is at least partially filled with a thermally non-conductive material.

16. The battery pack short circuit management system of claim 15, wherein said thermally non-conductive material is selected from the group of materials consisting of loose ceramic fibers, woven ceramic fibers, loose fiberglass fibers and woven fiberglass fibers.

17. The battery pack short circuit management system of claim 1, further comprising:

a first battery cooling system comprised of a first liquid coolant contained within a first coolant line in thermal communication with said plurality of cells; and a second battery cooling system comprised of a second liquid coolant contained within a second coolant line in thermal communication with said preselected cell, wherein said second battery cooling system is independent of said first battery cooling system.

18. The battery pack short circuit management system of claim 17, wherein said thermal isolation system is comprised of a thermal isolation enclosure, and wherein at least a portion of said second coolant line is integrated within at least one wall of said thermal isolation enclosure.

19. The battery pack short circuit management system of claim 1, further comprising a thermal runaway quenching system, wherein said thermal runaway quenching system is coupled to said preselected cell.

20. The battery pack short circuit management system of claim 19, wherein said thermal isolation system is comprised of a thermal isolation enclosure, and wherein said thermal runaway quenching system is incorporated into said thermal isolation enclosure.

21. The battery pack short circuit management system of claim 19, wherein said thermal runaway quenching system is not coupled to said plurality of cells.

* * * * *